United States Patent
Liao

(10) Patent No.: US 6,886,250 B2
(45) Date of Patent: May 3, 2005

(54) METHOD OF MANUFACTURING FOR ALUMINUM ALLOY WHEEL RIM

(76) Inventor: Shu-Yuan Liao, No. 8, Industrial Park 19th. Road, Taichung City (TW)

( * ) Notice: Subject to any disclaimer, the term of this patent is extended or adjusted under 35 U.S.C. 154(b) by 86 days.

(21) Appl. No.: 10/397,044

(22) Filed: Mar. 25, 2003

(65) Prior Publication Data

US 2004/0187312 A1 Sep. 30, 2004

(51) Int. Cl.[7] .............................................. B21K 1/38
(52) U.S. Cl. ........................... 29/894.324; 29/894.353; 72/353.2
(58) Field of Search ........................... 29/894.325, 894, 29/894.324, 894.353; 72/353.2, 355.4; 301/63.109

(56) References Cited

U.S. PATENT DOCUMENTS 2,406,062 A * 8/1946 Cornell ................... 29/894.325
3,263,315 A * 8/1966 O'Brien ................. 29/894.324

FOREIGN PATENT DOCUMENTS

| JP | 55-010385 | * | 1/1980 |
| JP | 62-279047 | * | 12/1987 |
| JP | 07-088588 | * | 4/1995 |

* cited by examiner

Primary Examiner—Eric Compton

(57) ABSTRACT

The manufacturing method for an aluminum alloy wheel rim consists of the following steps: (1) cutting aluminum alloy material; (2) heating the aluminum alloy material to make a marked center and fillet preformed blank; (3) forging the marked center and fillet preformed blank into a preformed blank; (4) punching a central axis of the preformed blank; (5) forging the punched preformed blank into an enlarged rough forging blank; and (6) forging the enlarged rough forging blank to form an aluminum alloy wheel rim. With this presenting invention the structural strength of the wheel rim is enhanced. In addition, the aluminum alloy wheel rim can be manufactured rapidly, thereby enhancing efficient productivity and improving quality of fabrication of the wheel rim.

4 Claims, 4 Drawing Sheets

METHOD OF MANUFACTURING FOR ALUMINUM ALLOY WHEEL RIM

BACKGROUND OF INVENTION

1. Field of Invention

The presenting invention relates to a manufacturing method for an aluminum alloy wheel rim. Particular reference is made to this manufacturing method wherein the structural strength of the aluminum alloy wheel rim is enhanced-and improved together with other advantages.

2. Description of Related Art

A conventional metallic wheel rim is produced by the lathe blade and technology involving spinning operation techniques and procedures. During the spinning operation of a conventional wheel rim, the turning lathe blade apparently cuts and hence breaks the structure of metallic crystals of wheel rim. In addition, the manufacturing duration by spinning operation of a conventional wheel rim takes a long period of time. As a result, the process by itself actually renders weaknesses in the structure of the wheel rim, while reducing productivity and the quality of fabrication of wheel rim is diminished. Furthermore, the high temperature at which a wheel rim blank is supposed to be maintained at is reduced apparently during long period of manufacturing process, thereby contributing to a lessen structural strength and quality of a conventional wheel rim.

SUMMARY OF THE INVENTION

The present invention is to mitigate and/or to obviate the disadvantages confer by conventional manufacturing method for a metallic wheel rim.

The primary objective of this new invention is to provide a manufacturing method for aluminum alloy wheel rim, wherein the structural strength of wheel rim is enhanced and improved over the conventionally produced wheel rim.

Another objective of the invention is to provide a method for the manufacturing of aluminum alloy wheel rim, wherein its production can be speed up rapidly, and thereby enhancing efficient productivity while at the same time maintaining the quality of fabrication of the wheel rim.

In accordance with this presenting new invention for industrial method of production, the following steps illustrate a typical procedure in making aluminum alloy wheel rim:

(1) cutting a pre-determined amount of aluminum alloy material;

(2) heating and forming the determined amount of aluminum alloy material to make a marked center and fillet preformed blank;

(3) forging the marked center and fillet preformed blank at high temperature in a setting/forming die into a preformed blank;

(4) punching a central axis in the preformed blank;

(5) forging the punched preformed blank at high temperature in a preheated setting/forming die of a rough forging blank into an enlarged rough forging blank; and (6) forging the enlarged rough forging blank at high temperature in a preheated finished forging die to form an aluminum alloy wheel rim.

Optimal Conditions for the Above Steps:

Optimally and preferably, the heating of marked center and fillet preformed blank 10 is heated at a temperature of 450° C.

Optimally and preferably, the marked center and fillet preformed blank is placed in a setting/forming die to be forged into an H-shaped preformed blank.

Optimally and preferably, the punched H-shaped preformed blank is heated at a temperature of 470° C.

Optimally and preferably, the enlarged rough forging blank is heated at a temperature of 470° C.

Optimally and preferably, the finished forging die includes two forming dies at two sides and two punching heads at front and rear sides.

Appreciation of further benefits and advantages of this presenting new invention will become apparent after a careful reading of detailed description with appropriate references to relevant accompanying drawings.

BRIEF DESCRIPTION OF THE ACCOMPANYING DRAWINGS

DETAILED DESCRIPTION OF THE INVENTION

Figure 1:
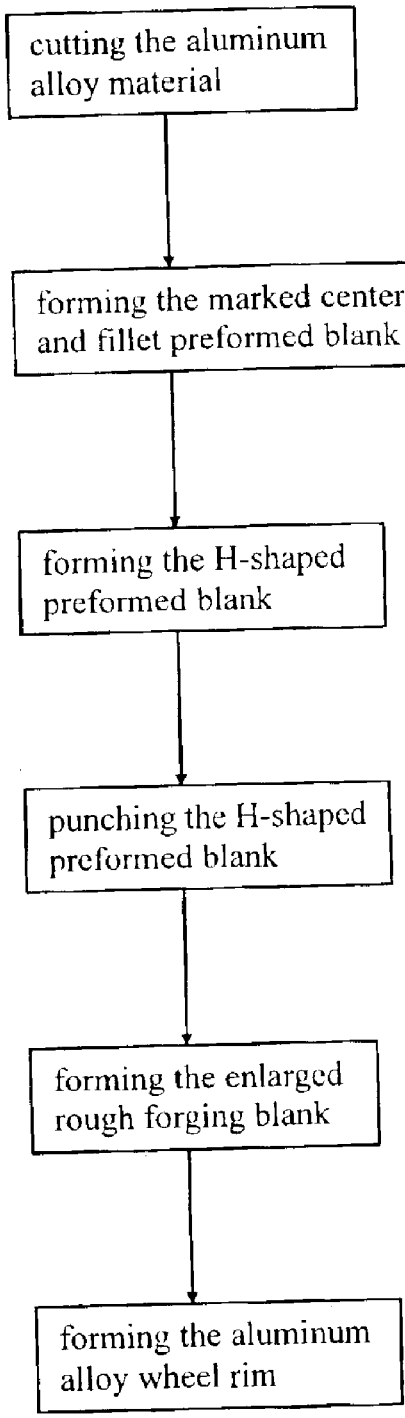
FIG. 1 is a flow chart illustrating the manufacturing method for aluminum alloy wheel rim in accordance with the preferred embodiment of the presenting invention.
Figure 2:
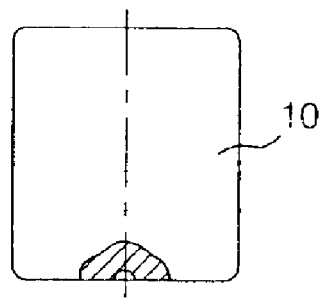
FIG. 2 is a partially cross-sectional view of a marked center and fillet preformed blank in accordance with the preferred embodiment of the presenting invention.
Figure 3:
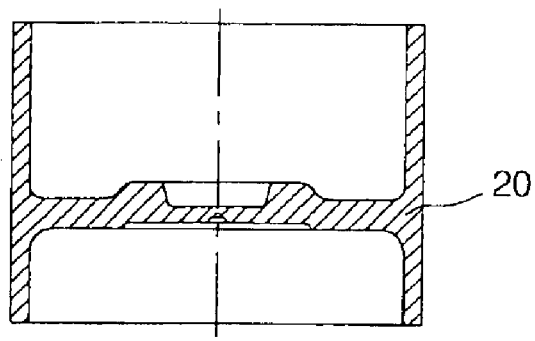
FIG. 3 is a cross-sectional view of a single H-shaped preformed blank in accordance with the preferred embodiment of the presenting invention.
Figure 4:
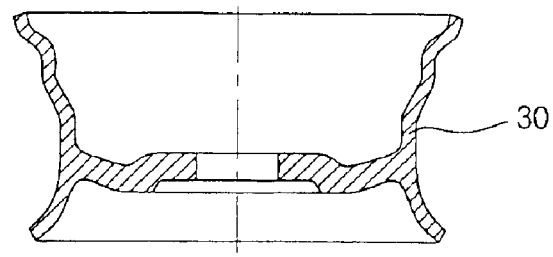
FIG. 4 is a cross-sectional view of an enlarged rough forging blank in accordance with the preferred embodiment of the presenting invention.
Figure 5:
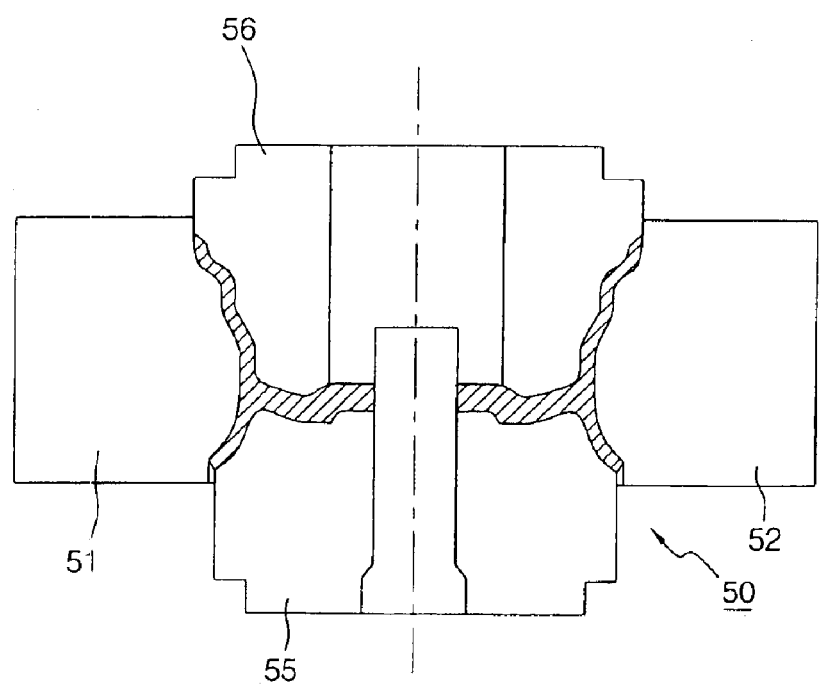
FIG. 5 is a cross-sectional view of a single preheated finished forging die in accordance with the preferred embodiment of the presenting invention.
Figure 6:
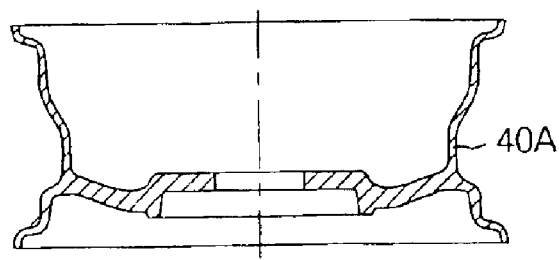
FIG. 6 is a cross-sectional view of an aluminum alloy wheel rim in accordance with the preferred embodiment of the presenting invention.

In reference to the accompanying drawings and with respect to FIGS. 1–6, the manufacturing method for aluminum alloy wheel rim in accordance with the preferred embodiment of the present invention comprises the following steps:

(1) cutting a determined amount of aluminum alloy material for making a metallic wheel rim;

(2) heating and forming the determined amount of aluminum alloy material to make a marked center and fillet preformed blank 10 (see FIG. 2), wherein the marked center and fillet preformed blank 10 has a cylindrical shape with a central axis that functions as a basis line to facilitate later forging process of the metallic wheel rim;

(3) heating the marked center and fillet preformed blank 10 at a temperature of 450° C. in a blast furnace, and subsequently forging the marked center and fillet preformed blank 10 in a setting/forming die into a H-shaped preformed blank 20 (see FIG. 3), wherein the marked center and fillet preformed blank 10 at high temperature produces a flow and expansion effect during the forging process, so that the marked center and fillet preformed blank 10 is forged into a H-shaped preformed blank 20 of the metallic wheel rim forge;

(4) punching a central axis of the H-shaped preformed blank 20 and placing the punched H-shaped preformed blank 20 in a setting/forming die of a rough forging blank for later processing into enlarging and forging process;

(5) heating the punched H-shaped preformed blank 20 at a temperature of 470° C. in a blast furnace, and subsequently forging the punched H-shaped preformed blank 20 in a preheated setting/forming die of a rough forging blank into an enlarged rough forging blank 30 (see FIG. 4), wherein the enlarged rough forging blank 30 has a profile similar to that of the wheel rim to facilitate later procedures; and (6) heating the enlarged rough forging blank 30 at a temperature of 470° C. in a blast furnace, and subsequently forging the enlarged rough forging blank 30 in a preheated finished forging die 50 (see FIG. 5) to form an aluminum alloy wheel rim 40A (see FIG. 6), wherein the enlarged rough forging blank 30 is squeezed at high temperature and extruded in the preheated finished forging die 50 to produce a flowing effect, so that the enlarged rough forging blank 30 is forged and formed between the forming dies 51 and 51, and the punching heads 55 and 56 of the preheated finished forging die 50, thereby forming an aluminum alloy wheel rim 40A.

Figure 7:
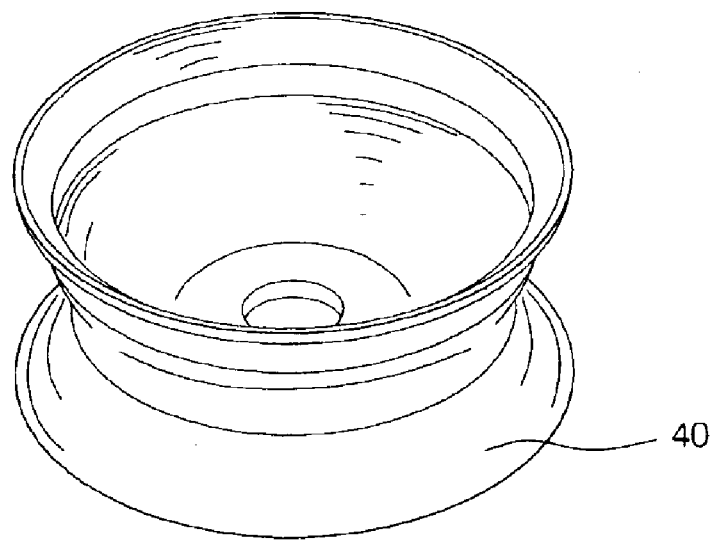
FIG. 7 is a perspective view of an aluminum alloy wheel rim product in accordance with the preferred embodiment of the presenting invention.

Finally, the aluminum alloy wheel rim 40A is processed by heat treatment and mechanical working procedures, thereby forming an aluminum alloy wheel rim product 40 as shown in FIG. 7.

Accordingly, the manufacturing method for the aluminum alloy wheel rim in accordance with the preferred embodiment of the present invention is illustrated briefly as follows.

First of all, a determined amount of aluminum alloy material is heated, forged and formed in order to make a marked center and fillet preformed blank 10 and a H-shaped preformed blank 20. Then, the H-shaped preformed blank 20 is punched and forged to form an enlarged rough forging blank 30 which has a profile similar to that of the wheel rim. Then, the enlarged rough forging blank 30 is squeezed at high temperature and extruded in the preheated finished forging die 50 to produce a flowing effect, so that the enlarged rough forging blank 30 is forged and formed in the preheated finished forging die 50, thereby forming the aluminum alloy wheel rim 40A. Finally, the aluminum alloy wheel rim 40A is processed by heat treatment and mechanical working procedures, thereby forming an aluminum alloy wheel rim product 40 as shown in FIG. 7.

In the processing manner described above, when the aluminum alloy blank is squeezed and extruded during the forging process, the metallic crystals of aluminum alloy is disposed at an extended state in high temperature and therefore the structure (of metallic crystals) of the aluminum alloy is not broken. Thus, this manufacturing invention confers superior structural strength on wheel rim, and this structural strength is greater than the conventional wheel rim that is made by lathe blade and the spinning operation technology. In comparison, during the spinning operation of the conventional wheel rim, the turning lathe blade apparently cuts and breaks the structure of metallic crystals. In addition, the duration for (1) the enlarged rough forging blank 30 is forged between the forming dies 51 and 51, and (2) the punching heads 55 and 56 of the preheated finished forging die 50, last for only a few seconds, so this effectively means that the aluminum alloy wheel rim 40A under the presenting invention can be manufactured rapidly, thereby enhancing efficient productivity and improving the quality of fabrication of the rim. On the contrary, the spinning operation of the conventional wheel rim takes a few minutes, thereby decreasing productivity while concurrently diminishing the quality of fabrication of the wheel rim. In addition, the temperature of the wheel rim blank at high temperature is reduced apparently during the long period of time, thereby further decreasing the structural strength and quality of the conventional wheel rim.

Although the invention has been explained in relation to its preferred embodiment(s) as mentioned above, it is to be understood that many other possible modifications and variations can be made without departing from the scope of the present invention. It is, therefore, contemplated that the appending claim or claims will cover such modifications and variations that fall within the true scope of the presenting new invention.

What the invention claims:

1. A manufacturing method for an aluminum alloy wheel rim, comprising the following steps:

(1) cutting a determined amount of aluminum alloy material;

(2) heating and forming the determined amount of aluminum alloy material to make a marked center and fillet preformed blank that are placed in a setting/forming die to be forged into an H-shaped preformed blank;

(3) forging the marked center and fillet preformed blank at high temperature in a setting/forming die into a preformed blank, wherein the marked center and fillet performed blank at high temperature produce a flow and expansion effect during the forging process;

(4) punching the central axis of the H-shaped preformed blank at a high temperature and placing the punched H-shaped preformed blank in a setting/forming die of a rough forging blank;

(5) forging the punched preformed blank at a high temperature in a preheated setting/forming die of a rough forging blank into an enlarged rough forging blank; and (6) forging the enlarged rough forging blank at a high temperature in a preheated finished forging die to form an aluminum alloy wheel rim, wherein the finished forging die includes two forming dies at two sides and two punching heads at front and rear sides;

whereby, the metallic crystals of aluminum alloy being disposed at an extended state in high temperature and therefore the structure of metallic crystals of the aluminum alloy being not broken when the aluminum alloy blank is squeezed and extruded during the forging process.

2. The manufacturing method for an aluminum alloy wheel rim in accordance with claim 1, wherein the heating of the marked center and fillet preformed blank is heated at a temperature of 450°.

3. The manufacturing method for an aluminum alloy wheel rim in accordance with claim 1, wherein the punched preformed blank is heated at a temperature of 470°.

4. The manufacturing method for an aluminum alloy wheel rim in accordance with claim 1, wherein the enlarged rough forging blank is heated at a temperature of 470°.

* * * * *